United States Patent [19]

Vandevoorde

[11] Patent Number: 5,006,196
[45] Date of Patent: Apr. 9, 1991

[54] INSTALLATION FOR APPLYING LABELLING SLEEVES TO ARTICLES SUCH AS CANS

[75] Inventor: Jean-Claude Vandevoorde, Montdidier, France

[73] Assignee: Protection Decoration Conditionnement Europe S.A., Montidier, France

[21] Appl. No.: 283,184

[22] Filed: Dec. 12, 1988

[30] Foreign Application Priority Data

Dec. 10, 1987 [FR] France ................................. 87 17242

[51] Int. Cl.⁵ .............................................. B32B 31/12
[52] U.S. Cl. ...................... 156/494; 53/291; 53/367; 53/585; 156/212; 156/556; 156/566; 156/567
[58] Field of Search ................. 156/494, 556, DIG. 9, 156/DIG. 12, DIG. 25, DIG. 27, DIG. 35, 64, 86, 212, 443, 367, 350, 362-363, 566, 567; 53/291-298, 367, 585; 198/428, 456, 689

[56] References Cited

U.S. PATENT DOCUMENTS

| | | | |
|---|---|---|---|
| 4,243,466 | 1/1981 | Lindee | 53/291 |
| 4,412,876 | 11/1983 | Lerner | 53/291 |
| 4,446,616 | 5/1984 | Waterman | 53/291 |

Primary Examiner—Robert A. Dawson
Attorney, Agent, or Firm—Hughes & Multer

[57] ABSTRACT

Installation for applying labelling sleeves to articles such as cans (3), which installation is characterized in that it comprises a rectilinear transporter (2) for the cans in which is inserted a lifting table (4) capable, each time it is actuated, of bringing a can into the raised position for the application of a sleeve by means of stretching pincers (7), at least one barrier being provided below the lifting table to maintain the aligned cans (3), arranged on the transporter, in position while the table (4) is in the raised position and, when the table is lowered, to allow the can provided with a sleeve to be reintroduced into the rectilinear alignment of the cans.

9 Claims, 7 Drawing Sheets

INSTALLATION FOR APPLYING LABELLING SLEEVES TO ARTICLES SUCH AS CANS

The invention relates to an installation for applying labelling sleeves to flexible or rigid supports or articles, of any shape, and in particular cans.

The invention is characterized in that it comprises a rectilinear transporter for cans in which is inserted a lifting table capable, each time it is actuated, of bringing a can into the raised position for the application of a sleeve by means of stretching pincers, at least one barrier being provided below the lifting table to maintain the aligned cans, arranged on the transporter, in position while the table is in the raised position and, when the table is lowered, to allow the can provided with a sleeve to be reintroduced into the rectilinear alignment of the cans.

According to another feature of the invention, the stretching pincers of the sleeve comprise two pairs of pincers mounted to pivot on plates which can be moved in the opposite direction parallel to the rectilinear alignment of the cans.

According to another feature of the invention, the drive which moves the plates originates with a jack and operates via an arm which pivots on a support, the position of this support being adjustable in order to ensure the adjustment of the position of the pairs of draw-stretching pincers.

According to another feature of the invention, each pincer is mounted pivotably on its plate and is fixed to an arm provided with a shaft portion which moves in the slot of an adjustable position guide.

The invention is shown by way of non-limiting example in the attached drawings, in which.

Consequently, the object of the present invention is to provide an installation of simple design and reliable operation which allows the application of stretchable plastic sleeves permitting labelling and, if appropriate, the grouping of articles such as cans. These cans move in a rectilinear manner, one behind the other, on a horizontal transporter, the invention thus making it possible successively to raise each can or group of cans to be labelled in order to extract it from the alignment cans, then to apply the labelling sleeve and return the said can to the alignment.

Figure 1:
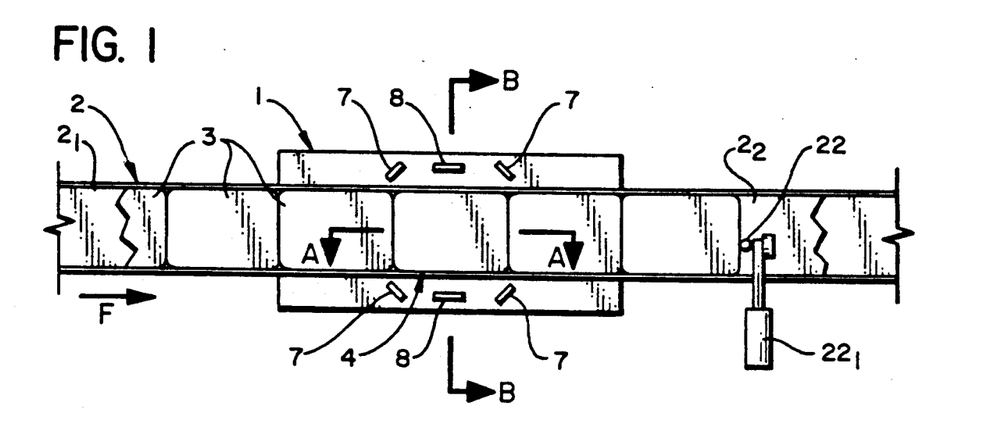
FIG. 1 is a diagrammatic view in elevation of an embodiment of the invention.

According to FIG. 1, an installation has thus been shown which comprises a frame 1, and a horizontal and rectilinear transporter 2, produced with the aid of endless conveyor belts or rollers. This transporter, which moves the cans 3 positioned one behind the other in the direction of the arrow F, comprises an upstream part $2_1$ and a downstream part $2_2$ separated by a lifting table 4 whose vertical movement is provided by a jack 5.

Figure 2:
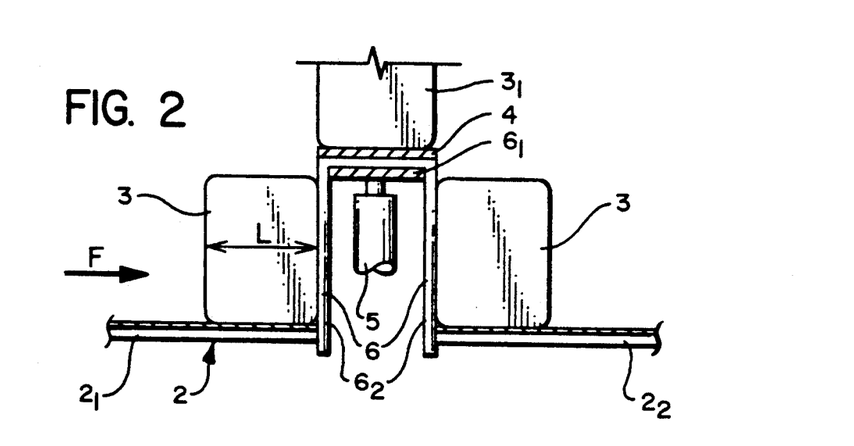
FIG. 2 is a diagrammatic view in section along A—A in FIG. 1.

The low position of the table 4 in the plane of the transporter 2 corresponds to the advancing movement of the alignment of cans 3 in the direction of the arrow F, while the high position of the table 4 (cf. FIG. 2) corresponds to the position in which a sleeve is applied around the can $3_1$ supported by this table 4 in the high position.

The table 4 possesses two sets of rods 6 folded at right angles whose horizontal arms $6_1$ can be adjusted as to position by sliding in the table 4, while the vertical arms $6_2$ hang below this table 4.

The arms $6_1$ slide in the direction of the arrow F in order to permit the adjustment of the distance between the vertical arms $6_2$ of the two sets of rods so that they correspond to the length "L" of a can to be labelled.

The vertical arms $6_2$ of these rods thus form barriers ensuring that the aligned cans are maintained in position while one of them is raised by the table in order to be labelled.

Likewise, this arrangement permits the reintroduction of the labelled can into the alignment without the latter or its neighbours being rocked or moved outside the alignment.

Figure 3:
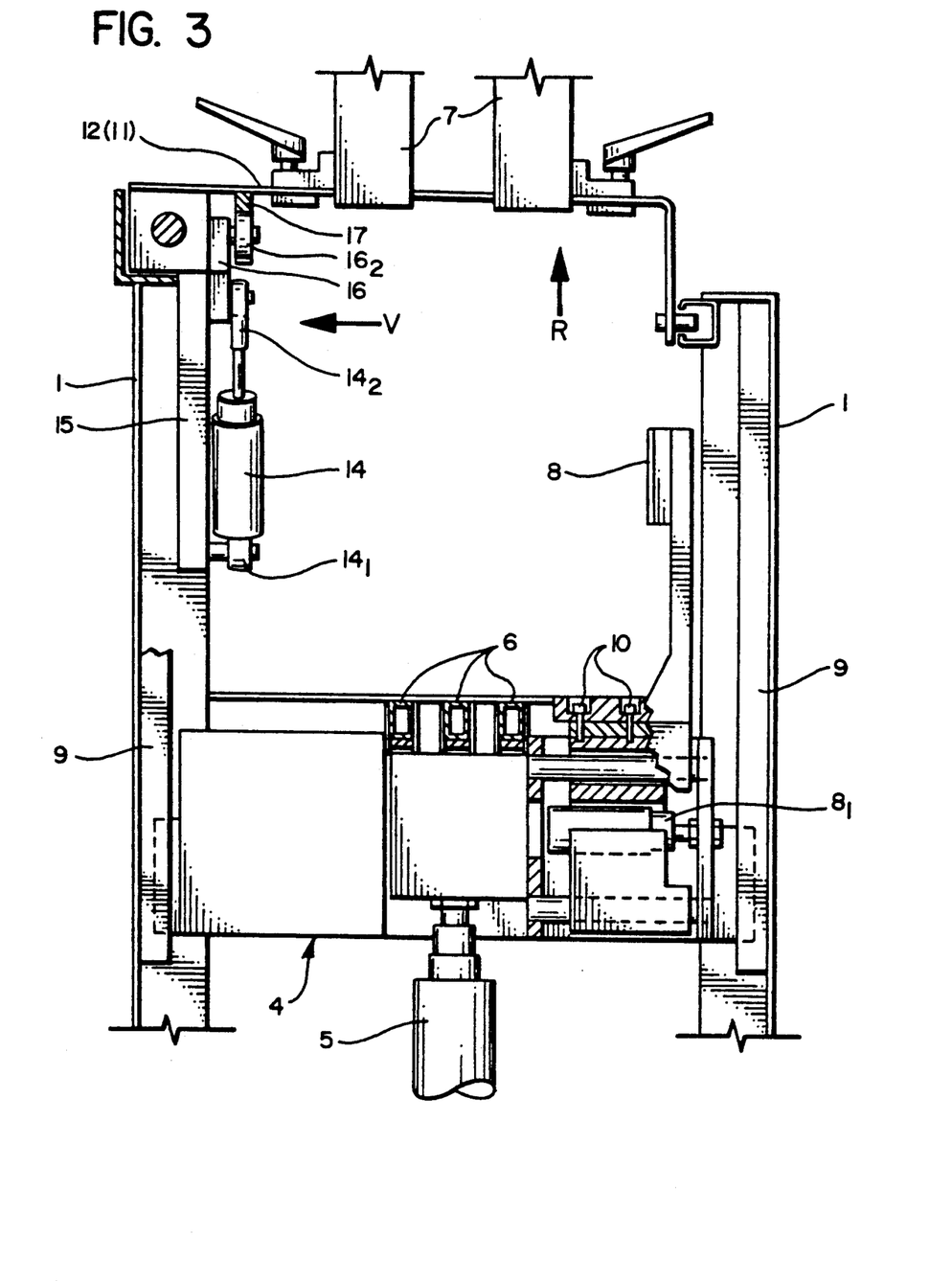
FIG. 3 is a section along B—B of a specific embodiment of the installation.
Figure 4:
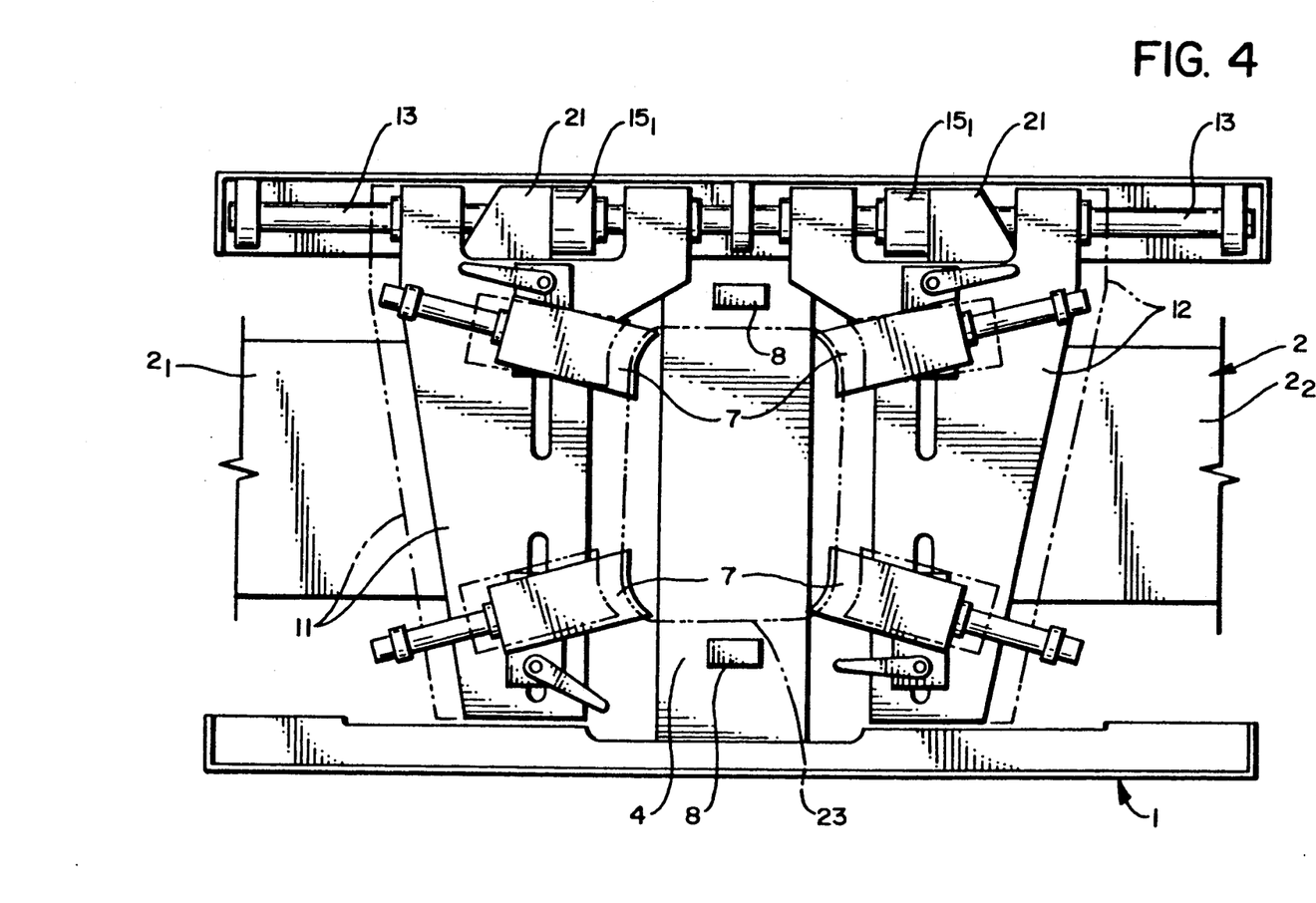
FIG. 4 is a view of FIG. 3 from above.

FIG. 3 likewise shows diagrammatically the four pincers 7 around which a labelling sleeve 23 is positioned manually or automatically, the movement of these pincers away from one another providing the stretching of the sleeve with a view to applying it to the can $3_1$ brought to the high position.

In this figure, the presence may likewise be noted of two lateral gripping arms 8 which are installed on the table 4 and which can be moved perpendicularly to the arrow F in order to come to grip the can before and after the application of a labelling sleeve, in order to prevent its rocking during these operations.

The table 4, which can be moved vertically under the action of the jack 5, is mounted to slide laterally on vertical slide rails 9 (cf. FIG. 3). In this FIG. 3, it is likewise possible to see one of the lateral gripping arms 8, these arms being movable under the action of a jack $8_1$ and being adjustable via screws 10 in order to adapt the maximum closeness and spacing of the gripping arms 8 to the width of a can.

Figures 5, 6, 7:
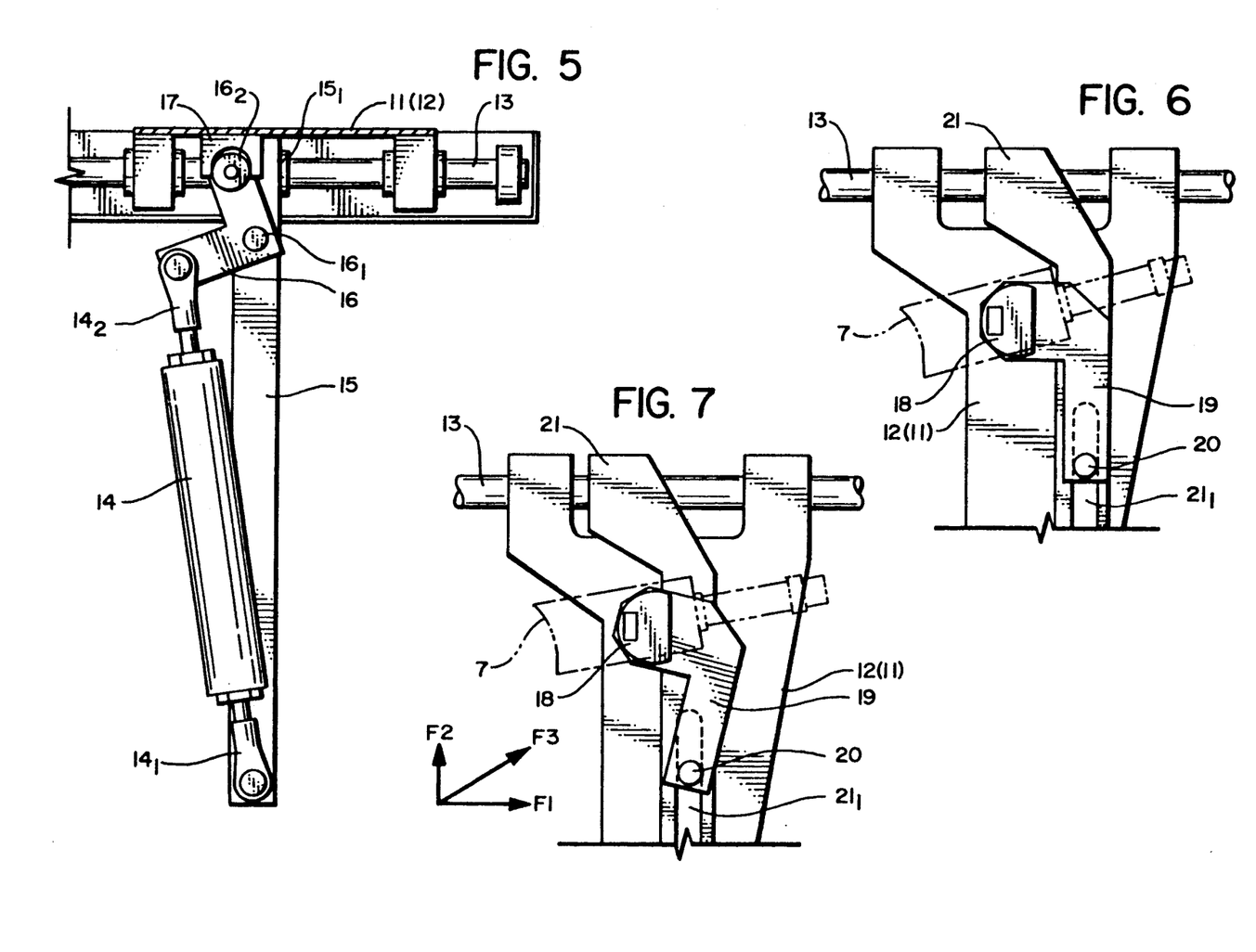
FIG. 5 is a view following the arrow V in FIG. 3.
FIG. 6 is a view of the mechanism for controlling the stretching pincers, taken along the arrow R in FIG. 3.
FIG. 7 is a view corresponding to FIG. 6, the pincers being in the open position.
Figure 8:
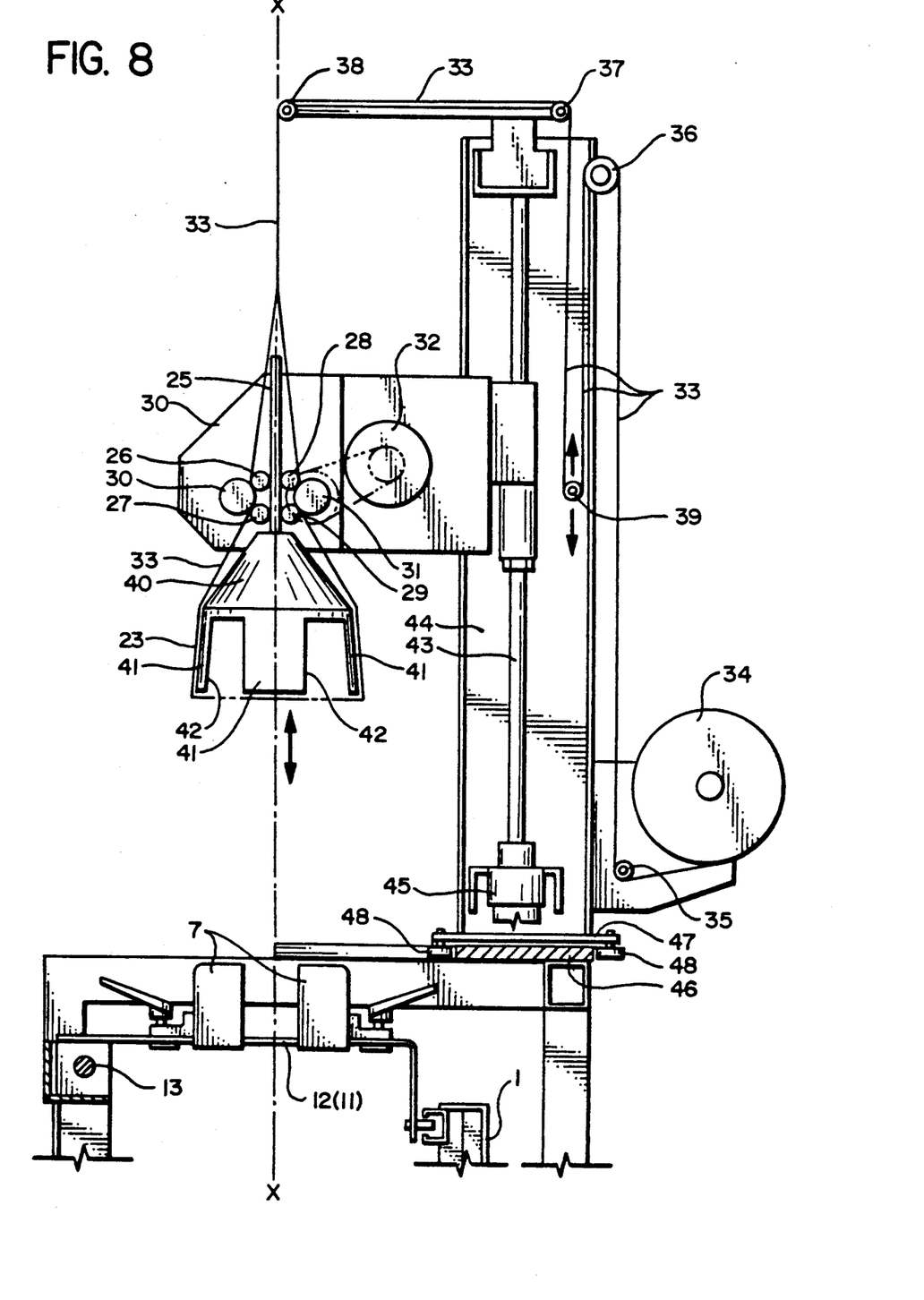
FIG. 8 is a view in section along B—B of an embodiment of the invention, this view representing the upper part of the installation with its sleeve feeding devices.

The four stretching pincers 7 are supported in pairs on plates 11 and 12 mounted to slide horizontally on a shaft 13. The movement of these plates 11 and 12 is provided by jacks 14 (cf. FIGS. 3 and 5). These jacks provide movement of the two plates 11 and 12 in opposite directions in order for the two pairs of pincers 7 mounted on each plate to be able to be brought together or moved apart from one another, for the application of a sleeve to the pincers and then for its stretching, respectively. Each jack 14 is a double-action jack and one of the rods $14_1$ is connected in an articulated manner to the lower end of a support 15 fitted in an adjustable manner at $15_1$ on the shaft 13. The other rod of the jack 14 is connected in an articulated manner to an angled arm 16 which pivots at $16_1$ on the support 15 and which is connected via a roller $16_2$ to a member 17 fixed below one of the plates 11 or 12.

The supply of power to the jack 14 thus makes it possible to move the plates 11 and 12 in opposite directions, either to move them apart or to move them together, this movement apart being able to conform to two amplitudes, depending on whether one or both parts of the double jacks are supplied with power, the purpose of this being to obtain two degrees of stretching of the sleeve, as will be explained below.

The stretching pincers 7 are mounted to pivot on the plates 11 or 12 by means of spindles 18. Moreover, these pincers 7 are fixed to the arm ends 19 which are provided with a spindle portion 20 which can be moved in a slot $21_1$ provided on an arm 21 fixed in an adjustable manner to the shaft 13. Thus, when the plates 11 and 12 tend to move apart under the action of the jack 14, they likewise move the pincers 7 in the same direction (arrow F1), but given that the spindle 20 is retained in the slot $21_1$ of the fixed member 21 during this movement of the plates 11 or 12, the member 19 pivots about the spindle $21_1$ in order to move the end of the pincer 7 in the direction of the arrow F2, although the combination of these two movements in the directions F1 and F2 is expressed by an oblique movement in the direction of the arrow F3 which tends to move the four pincers 7 away from one another. This arrangement makes it possible to produce transverse stretching of the sleeve in two directions, in order to allow its ready application to the can $3_1$ which has been brought into the high position.

Figure 9:
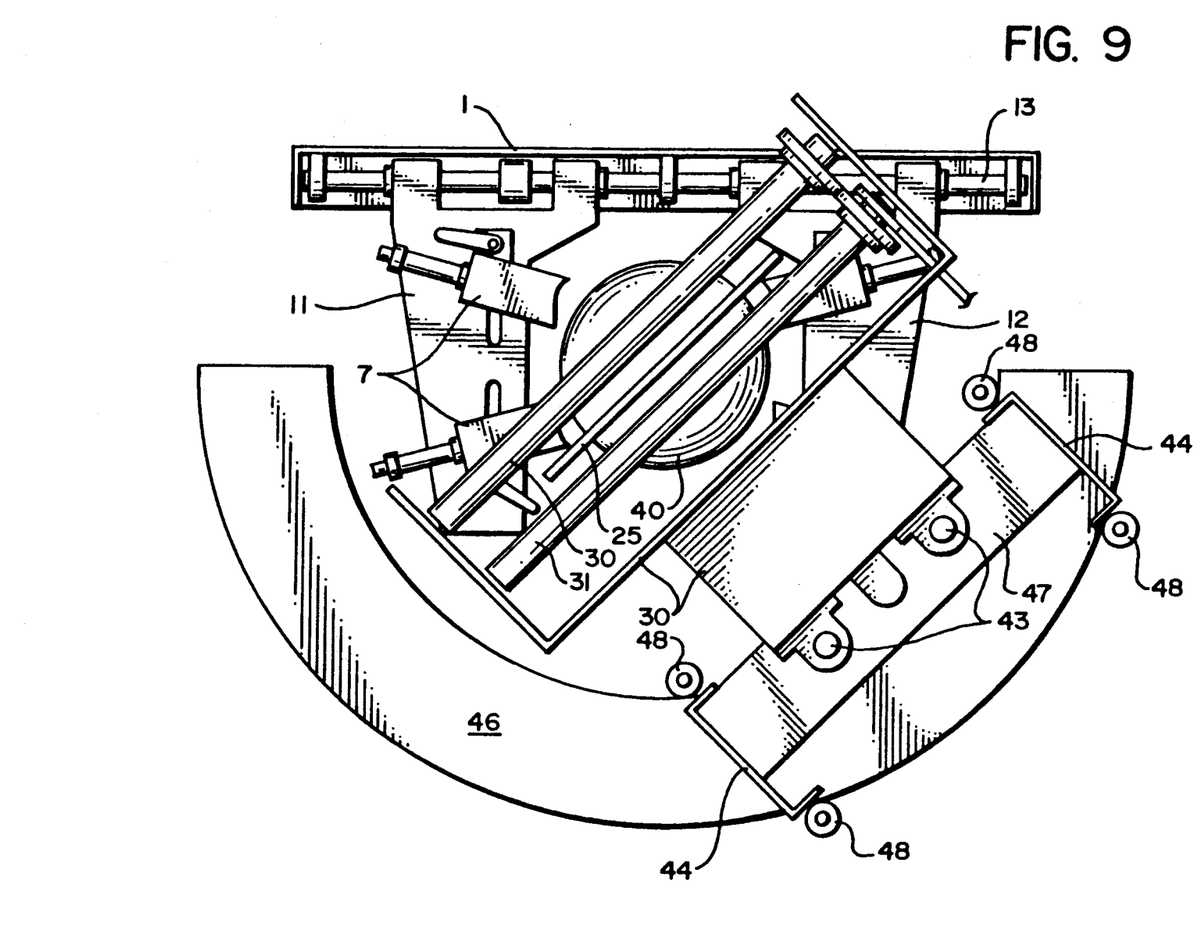
FIG. 9 is a view of FIG. 8 from above.
Figure 10:
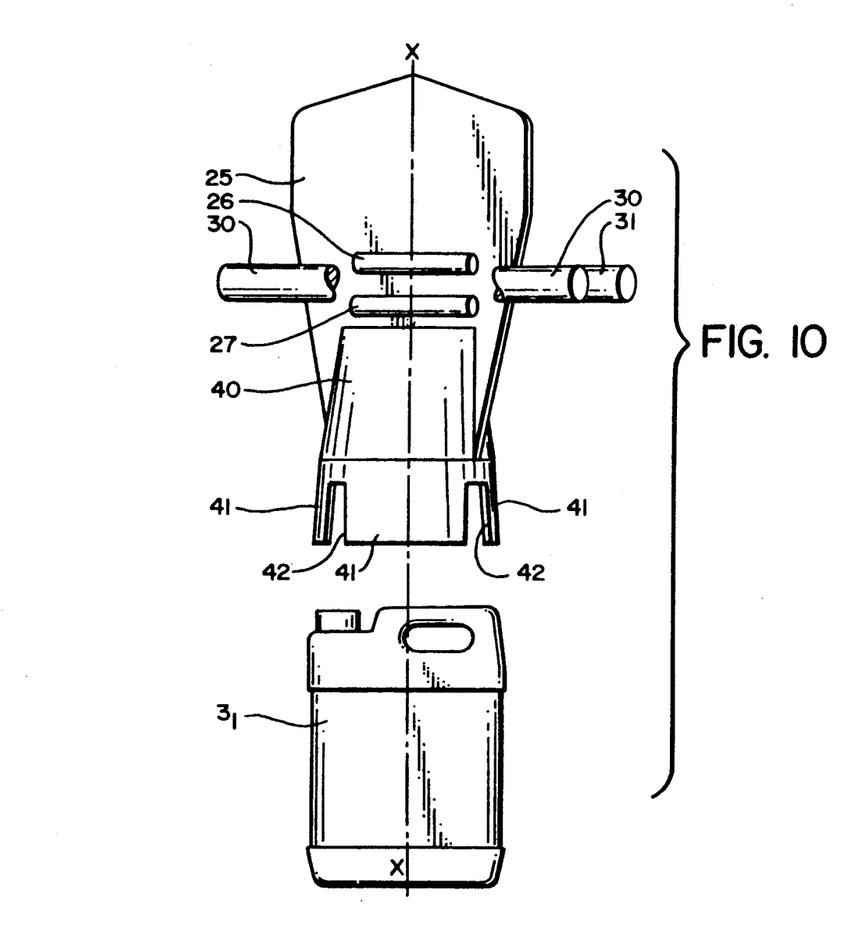
FIG. 10 is a perspective view of the sleeve shaper.

The mechanism shown in FIGS. 9 and 10 relates more particularly to the devices providing the shaping of the sleeve 23 and its application to the can $3_1$ situated in the high position after pincering and stretching by the pincers 7.

This shaping device comprises a plate 25 possessing on each of its faces a pair of rollers 26-27 and 28-29 which rotate freely. These rollers are at a slight distance apart and the plate 25 is arranged between two spindles 30 and 31 carried by a carriage 30. The rollers 26-27 and 28-29 of each pair are placed in contact with one of the spindles 30 and 31 in a manner such that the plate 25 is thus retained and suspended between these two spindles 30 and 31. At least one of the two spindles 30 and 31 is driven to rotate by a motor 32.

The sleeve 23 which has to be applied to a can comes from a strip of pre-cut sleeves 33 running off a roll 34. This strip 33 passes over return pulleys 35, 36, 37 and 38 and also over a pulley 39 suspended in a loop of strip in order to maintain the strip under uniform tension. This strip 33 is threaded onto the plate 25 of the shaper whose width corresponds substantially to the flat width of the sleeve. The sleeve is likewise threaded over the pairs of rollers 26-27 and 28-29, between the spindles 30 and 31, in a manner such that the power supply of the motor 32 causes the strip of sleeves 33 to move down by unrolling it from the roll 34.

The base of the plate 25 possesses an extension 40 provided with a lower part 41, in the general shape of a frustum having a circular base, whose lateral wall possesses four apertures 42 whose dimensions correspond substantially to those of the pincers 7.

When power is supplied to the motor 32, the strip 33 of the sleeve is thus driven over the extension 40, 41 in order for the last sleeve 23 to be applied to a can is situated at the height of this extension 41.

According to another version of the shaper (FIG. 11) the strip of precut sleeves 33 is threaded over the plate 25 of the shaper whose width corresponds substantially to the flat width of the sleeve. The sleeve is likewise threaded over the pairs of rubberized rollers 26-27 and 28-29 which are fixed to a cylindrical section 40 arranged in the extension of the plate 25. the rollers 26-27 and 28-29 are placed beteen the two spindles 30-31 which support the shaper. The supply of power to the motor 32 causes the strip of sleeves 33 to move down, unrolling it from the roll 34.

Figure 11:
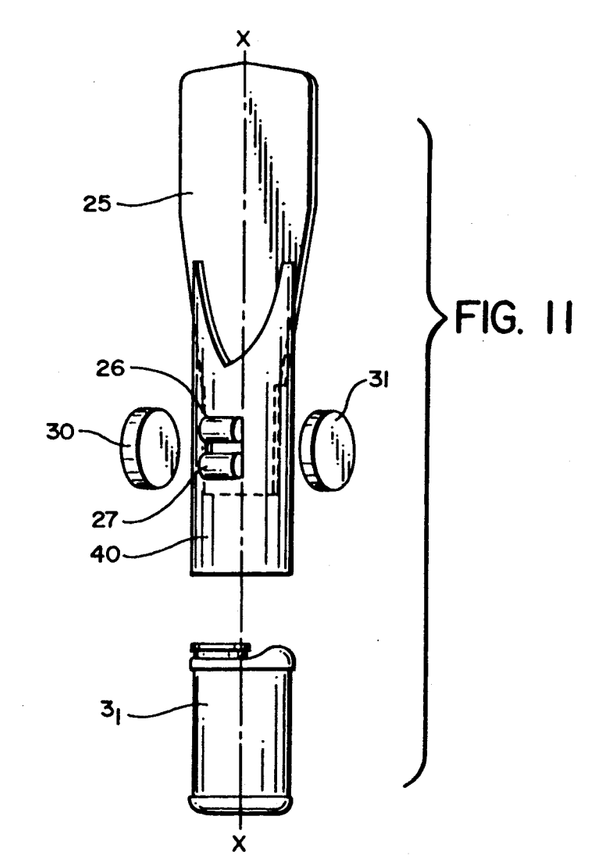
FIG. 11 is a perspective view of another embodiment of the sleeve shaper.

In this case, the cylindrical extension 40 has no aperture 42. This arrangement substantially simplifies the manufacture of the shaper and improves some of its characteristics, namely: better guiding of the strip 33, faster advance of the strip 33, elimination of deformation and wear of the part 41.

The carriage 30 is supported by a vertical column 43 mounted slideably on a framework 44 and actuated by a jack 45. the supply of power to this jack 45 thus makes it possible to lower and raise both the carriage 30 and the sleeve 23, these movements of the carriage being compensated, in the case of the strip 33, by the tensioning pulley 39.

The framework 44 of the shaper mechanism and the mechanism for driving the strip of sleeves is supported by the framework 1 in a manner such that the vertical axis X—X passing through the middle of the lifting table 4 likewise passes in the axis of the extension 40, 41 of the shaper.

The framework 44 is supported by the frame 1 via a plate 46 in the form of a semi-circular collar on which bears the base 47 of the framework 44. The centre of the semi-circular plate 46 merges with the axis X—X and the framework 44 is mounted to be movable on this plate 46 in order for it to be possible to select the angular position of the shaper 25, 40, 42 relative to the angular position of the can supported by the lifting table 4, to which can the sleeve 23 is to be applied.

In order to permit the adjustment of this angular position, the base 47 is provided with guide rollers 48 applied against the arcuate edges of the plate 46.

The purpose of this arrangement is to permit the sleeve 23 to be applied in accordance with an angular position determined in relation to the can $3_1$. In fact, these strips of sleeves are obtained from a flat web which is printed for decorative, branding or reference purposes, then this printed web is closed into the shape of a tube by thermowelding of its two longitudinal edges. It is important here, whatever may be the shape and dimensions of the can, that the thermowelding line should be situated at a precise position on the periphery of the can, and preferably level with one of its angles, in order that the printing of the sleeve which is intended to be located on one of the faces of the can should be correctly positioned on that face and not straddling two adjacent faces.

The arrangement according to the invention thus permits precise and accurate application of a sleeve 23 to a can without it being necessary for the strip of sleeves to be subject to special preparation as a function of the width and length of this can.

This device operates in accordance with an automatic cycle by means of end-of-travel sensors which detect the end of one movement and trigger the subsequent movement. FIG. 1 attached shows only the end-of-travel sensor 22 which is arranged in the path of the cans 3 moved by the downstream section $2_2$ of the transporter 2. The distance between the end-of-travel sensor and the table 4 is adjustable in a manner such as to correspond to a multiple of the length L of a can 3. In the example shown, this multiple is equal to 2.

This end-of-travel sensor 22 thus forms a stop to immobilize the alignment of cans 3 in a manner such that one of them is situated above the table 4 when this end-of-travel sensor 22 triggers the operating cycle.

The first stage of the cycle consists in supplying power to the jack 45 in order to cause the carriage 30 to descend in a manner such that the pincers 7 are placed within the apertures 42 of the extension 41. The pincers 7 are then actuated in order to grip the sleeve 23 and stretch it. Then the power supply to the jack 45 is reversed and the carriage 30 is raised, the effect of which is to separate the sleeve 23 from the end of the strip at the level of a pre-cut line provided for that purpose.

The second stage of the cycle, the period of execution of which can partly overlap with the first stage, consists in raising the table 4 of the lifter by supplying power to the jack 5 while tightening the arms 8 on the can $3_1$ in order to prevent its rocking. At this stage, the can $3_1$ is placed at a first level where it is not yet introduced into the sleeve.

The pincers 7 of the sleeve are then opened in order to permit the stretched sleeve to fall by gravity to the base of the pincers, where this correct position of the sleeve has not already been achieved during the first stage of the cycle.

It will be noted that, oncethe lifter table 4 has been raised, the end-of-travel sensor 22 which triggered these movements of the operating cycle retracts under the action of the jack $22_1$ in order to permit the first labelled can to be removed from the alignment of cans.

The third operating stage consists in reactuating the jacks $8_1$ in order to move the arms 8 apart so as to permit the subsequent application of the sleeve. The lifter table 4 continues its upward movement, and when the can is threaded into the stretched sleeve the jacks $8_1$ are again actuated by retightening the arms on the can via the sleeve which was previously applied. The pincers 7 are released from the sleeve and the table 4 continues its upward movement until these pincers 7 are totally disengaged from the sleeve.

The final stage then consists in supplying power to the second part of the jacks 14 in order to move the pincers 7 slightly away from the can $3_1$ which has just received the sleeve, then supplying power to the jack 5 in order to bring the table 4 into the low position.

Following this movement, the can $3_1$ provided with its sleeve is repositioned in the rectilinear alignment of the cans arranged on the transporter 2, given that the barriers formed by the rods 6 have maintained the upstream and downstream cans of the alignment in position.

The lifter having returned to the low position, the end-of-travel stop 22 resumes its place in the path of the cans on the transporter, in order to detect the start of a new cycle, while the two parts of the jacks 14 return to their initial position.

I claim:

1. An installation for applying labelling sleeves to articles, which installation comprises a frame (1) provided with a table (4) to support the articles and bring the articles into a position for the application of the sleeves, a shaping device (25, 23, 27, 30, 31) to shape the sleeves about a vertical axis of the shaping device, pincers (7) to stretch the shaped sleeves and to apply them on the articles, the installation being characterized in that the shaping device is mounted on a framework (44) which is itself supported by the frame (1) via means (46, 47, 48) to allow the rotation of the framework (44) about a vertical axis (X—X') which passes through the middle of the table (4) and through the vertical axis of the shaping device.

2. An installation according to claim 1, characterized in that the shaping device is vertically movable on the framework (44).

3. An installation according to any one of the preceding claims, characterized in that the shaping device is constituted by a plate (25) provided with at least one pair of rollers (26, 27, 28, 29) rotating freely on each of its faces, this plate being maintained in the suspended state between parallel axes disposed between the two rollers of each pair, one of these axes being a drive spindle, the plate being provided, at its base, below the pair of rollers, with a circular extension.

4. An installation according to claim 2, characterized in that the circular extension forms a frustum-shaped part (41) having a circular base, this extension being provided with lateral apertures (42) for the passage of the pincers (7) stretching the sleeve.

5. An installation acording to claim 1, characterized in that it further comprises a rectilinear transporter (2) for the articles, the rectilinear transporter having upstream and downstream parts separated by the table (4) for transporting the articles to and from the table in rectilinear alignment with one another.

6. An installation according to claim 5, characterized in that the pincers for stretching the sleeve comprise a first pair of pincers mounted on a first plate (11) and a second pair of pincers mounted on a second plate (12), the first and second plates being movable in the opposite directions which are parallel to the rectilinear alignment of the articles.

7. An installation according to claim 6, characterized in that the drive which moves the plates (11, 12) originates with a jack (14) and operates via an arm (16) which pivots on a support (15), the position of this support being adjustable in order to ensure the adjustment of the position of the pairs of stretching pincers.

8. An installation according to claim 6, characterized in that each stretching pincer is mounted pivotably on a plate and is fixed to an arm (19) via a slot ($21_1$) to an adjustable positioning guide, the position of the pincers (7) being adjustable perpendicularly to the alignment of the articles.

9. An installation according to claim 6, characterized in that each pincer is mounted fixedly on a plate, the position of the pincers being adjustable perpendicularly to the alignment of the articles.

* * * * *